US012065388B2

(12) United States Patent
Schwarz et al.

(10) Patent No.: US 12,065,388 B2
(45) Date of Patent: Aug. 20, 2024

(54) METHOD AND APPARATUS FOR ELECTROCHEMICAL TREATMENT OF CONCRETE STRUCTURES AFFECTED BY ASR

(71) Applicants: Structural Technologies, Columbia, MD (US); Inprom Anstalt, Triesen (LI)

(72) Inventors: Wolfgang Schwarz, Vienna (AT); Eyad Alhariri, Columbia, MD (US)

(73) Assignees: STRUCTURAL TECHNOLOGIES, Columbia, MD (US); INPROM ANSTALT, Triesen (LI)

( * ) Notice: Subject to any disclaimer, the term of this patent is extended or adjusted under 35 U.S.C. 154(b) by 200 days.

(21) Appl. No.: 16/970,801

(22) PCT Filed: Mar. 7, 2019

(86) PCT No.: PCT/EP2019/055750
§ 371 (c)(1),
(2) Date: Aug. 18, 2020

(87) PCT Pub. No.: WO2019/170824
PCT Pub. Date: Sep. 12, 2019

(65) Prior Publication Data
US 2021/0107842 A1     Apr. 15, 2021

(30) Foreign Application Priority Data
Mar. 7, 2018   (AT) .................................. A 64/2018

(51) Int. Cl.
*C04B 41/45*     (2006.01)
*C04B 41/46*     (2006.01)
(Continued)

(52) U.S. Cl.
CPC ...... *C04B 41/4564* (2013.01); *C04B 41/4539* (2013.01); *C04B 41/463* (2013.01);
(Continued)

(58) Field of Classification Search
CPC .................................................. C04B 41/4564
See application file for complete search history.

(56) References Cited

U.S. PATENT DOCUMENTS 5,021,260 A * 6/1991 Kitagawa ................ C04B 41/65
427/403
5,368,709 A   11/1994 Utklev
(Continued)

FOREIGN PATENT DOCUMENTS

EP     0398356 A1   11/1990
WO     9404474 A1   3/1994
(Continued)

OTHER PUBLICATIONS

Mccarter et al ("Electrical conductivity, diffusion, and permeability of Portland cement-based mortars", Cement and Concrete Research, 30, 2000, pp. 1395-1400). (Year: 2000).*
(Continued)

*Primary Examiner* — Alexander W Keeling
(74) *Attorney, Agent, or Firm* — CANTOR COLBURN LLP

(57) ABSTRACT

The present invention relates to a method for impregnating concrete with a non-aqueous electrolyte characterized in that an electric field is applied between electrodes mounted on the concrete surface and/or embedded in the concrete such that the non-aqueous electrolyte migrates into the concrete. Preferably, lithium ions are dissolved in the non-aqueous electrolyte.

18 Claims, 3 Drawing Sheets

(51) Int. Cl.
  *C04B 41/50* (2006.01)
  *C23F 13/02* (2006.01)
  *E04G 21/02* (2006.01)

(52) U.S. Cl.
  CPC ........ *C04B 41/5009* (2013.01); *C04B 41/501* (2013.01); *C04B 41/5072* (2013.01); *C23F 13/02* (2013.01); *E04G 21/02* (2013.01); *C23F 2201/02* (2013.01)

(56) References Cited

U.S. PATENT DOCUMENTS

| | | | | |
|---|---|---|---|---|
| 5,405,509 | A | * | 4/1995 | Lomasney .............. B09C 1/085 205/688 |
| 5,755,945 | A | | 5/1998 | Kristiansen |
| 8,377,278 | B1 | * | 2/2013 | Cardenas ................ C04B 41/68 204/450 |
| 2010/0006209 | A1 | * | 1/2010 | Femmer .................. C25D 5/48 156/150 |
| 2014/0224670 | A1 | * | 8/2014 | Ishikawa ................ C23F 13/16 204/196.01 |
| 2015/0021201 | A1 | * | 1/2015 | Hatori .................... C23F 13/00 205/730 |

FOREIGN PATENT DOCUMENTS

| | | | | |
|---|---|---|---|---|
| WO | WO-9404474 | A1 | * 3/1994 | ............ C04B 28/02 |
| WO | 9732828 | A1 | 9/1997 | |

OTHER PUBLICATIONS

Junsomboon et al ("Determination of Potassium, Sodium, and Total Alkalies in Portland Cement, Fly Ash, Admixtures, and Water of Concrete by a Simple Flow Injection Flame Photometric System", Journal of Automated Methods and Management in Chemistry, 2011, pp. 1-9) (Year: 2011).*

International Search Report for corresponding application PCT/EP2019/055750 filed Mar. 7, 2019; Mail date May 17, 2019.

International Preliminary Report on Patentability for corresponding application PCT/EP2019/055750 filed Mar. 7, 2019; Mail date May 27, 2020.

Written Opinion for the International Searching Authority for corresponding application PCT/EP2019/055750 filed Mar. 7, 2019; Mail date May 17, 2019.

* cited by examiner

METHOD AND APPARATUS FOR ELECTROCHEMICAL TREATMENT OF CONCRETE STRUCTURES AFFECTED BY ASR

SUMMARY

The invention concerns a method and a device for impregnating concrete with a non-aqueous electrolyte characterized in that an electric field is applied between electrodes mounted on the concrete surface and/or embedded in the concrete such that the non-aqueous electrolyte migrate into the concrete and alkali ions migrate from the concrete, and further characterized in that lithium ions are dissolved in the non-aqueous electrolyte migrating simultaneously with the nonaqueous electrolyte into the concrete. The electric field is generated by a current flow between the electrodes, preferably between one electrode mounted on the concrete surface and at least one electrode embedded in the concrete. However, it can also be generated by the current flow between electrodes embedded in the concrete or between electrodes on opposite surfaces of a concrete component. The method in accordance with the invention is characterized in particular by the fact that both lithium ions migrate into the concrete in the electric field and alkali ions migrate from the concrete to the cathodically polarized electrode and are absorbed there by a suitable medium. The non-aqueous electrolytes that can be used are preferably alcohols, diols, polyols and polyethers.

The inventive method is characterised by the fact that damage caused to concrete by an alkali-silica reaction (ASR), also known as an alkali aggregate reaction (AAR), is prevented or at least greatly reduced.

DESCRIPTION OF THE INVENTION

Figure 1:
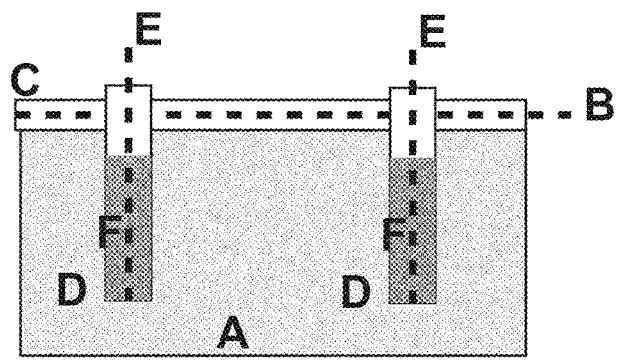
FIG. 1 shows an emobdiment of an arrangement of electrodes.

The invention concerns a method and device for impregnating concrete with a non-aqueous electrolyte characterized in that an electric field is applied between electrodes mounted on the concrete surface and/or embedded in the concrete such that the non-aqueous electrolyte migrates into the concrete and alkali ions migrate from the concrete. The invention is further characterized in that preferentially lithium ions are dissolved in the non-aqueous electrolyte that migrate simultaneously with the non-aqueous electrolyte into the concrete. The electric field is generated by a current flow between the electrodes, preferably between one electrode mounted on the concrete surface and at least one electrode embedded in the concrete. However, it can also be generated by the current flow between electrodes embedded in the concrete or between electrodes on opposite surfaces of a concrete component. In reinforced concrete, the steel reinforcement may be used as cathode. The method in accordance with the invention is characterized in particular by the fact that both lithium ions migrate into the concrete in the electric field and alkali ions migrate from the concrete to a cathodically polarized electrode and may be absorbed there by a suitable medium. The non-aqueous electrolyte for the mitigation of the alkali-silica reaction (ASR) is characterized as a medium that is able to dissolve lithium salts, exhibits an electrolytic conductivity and preferentially shows hygroscopic properties and is partially miscible with water. The inventive method is characterised by the fact that damage caused to concrete by an alkalisilica reaction (ASR), also known as an alkali aggregate reaction (AAR), is prevented or at least greatly reduced.

The ASR can cause severe damage to concrete structures such as bridges, motorway pavements, dams, railway sleepers, retaining walls, etc. (see e.g. J. Stark and C. Giebson, *Assessing the Durability of Concrete Regarding ASR*, in Malhotra, V. M., Proceedings of the 7th CANMET/ACI Conference on Durability of Concrete, Montreal, Canada (2006), pp 225-238 (ACI—Special Publication SP234-15, Mar. 22, 2006); D. W. Hobbs, *Alkali-Silica Reaction in Concrete*, Thomas Telford, London, 1988; James A. Farny and Beatrix Kerkhoff, *Diagnosis and Control of Alkali-Aggregate Reactions in Concrete*, Concrete Technology, PCA R&D Serial No. 2071b, Portland Cement Association (2007); and I. Sims, A. Poole, *Alkali-Aggregate Reaction in Concrete: A World Review, CRC Press* (2017)). The ASR occurs when the concrete is exposed to moisture and has been produced with gravel containing too much soluble silica and the concrete has been produced with a binder, usually Portland cement, with a high content of alkalis, especially sodium. In Germany, the need for the redevelopment of the runways of airports affected by ASR alone is estimated at 1.2 billion euros in 2016 (see J. Stark and C. Giebson, *Assessing the Durability of Concrete Regarding ASR*, in Malhotra, V. M., Proceedings of the $7^{th}$ CANMET/ACI Conference on Durability of Concrete, Montreal, Canada (2006), pp 225-238 (ACI—Special Publication SP234-15, Mar. 22, 2006)).

A number of strategies and technologies have been developed to prevent ASR-induced damage in the manufacture of concrete components—such as admixtures to concrete, avoiding the use of reactive aggregates, reducing the alkali content of Portland cement. However, these methods cannot be applied to existing concrete structures and concrete components.

A method to avoid ASR induced damage in concrete is considered promising: The impregnation of concrete with lithium ions as described for example in the patent application WO 94/04474. A number of investigations have shown that lithium ions can prevent or at least greatly reduce ASR-induced concrete damage. In the electrochemical impregnation of concrete with lithium ions, an anode is usually placed on the concrete surface or inserted into the concrete, as described for example in WO 94/04474. The anode is embedded in a medium with a high content of lithium salts. Between the anode and the reinforcing steel as cathode, voltages of up to 40 volts are applied and currents in the range of several $A/m^2$ concrete surface are conducted. In the resulting electric field ions migrate, positively charged ions as lithium, sodium and potassium ions migrate in the direction of the negatively charged cathode, while negatively charged ions migrate to the anode. In addition, it should be noted that acid is formed at the anode by anodic oxidation of water, which can damage the concrete, and hydroxyl ions are formed at the cathode, usually the steel reinforcement in the concrete component, by cathodic reduction of water, which lead to an increase in the pH value. It is possible to transport lithium ions into the concrete by migration in the applied electric field. However, using an aqueous electrolyte as transport medium—water is transferred together with the lithium ions into the concrete matrix accelerating ASR. The ASR mitigating effect of lithium will therefore be at least counter-balanced by the ingress of humidity into the concrete. Furthermore, it turned out that sodium, potassium and hardly any lithium ions accumulate on the reinforcing steel polarized as a cathode. The high sodium ion content and the strongly increased pH value in the area of the steel reinforcement accelerate the ASR reaction. Overall, the positive effect of lithium ion migration into the concrete is only cancelled out in the best case.

The object of the present invention was therefore to develop a method and a device which, on the one hand, achieves sufficient impregnation of the concrete with lithium ions to prevent or at least slow down the progression of ASR without additional ingress of humidity into the concrete through the electrolyte in which the lithium ions are dissolved. Preferentially, local accumulation of harmful sodium ions and hydroxyl ions, which cause an acceleration of ASR shall be avoided.

Surprisingly, the object could be fulfilled by means of an inventive method of electrochemical transport of a non-aqueous electrolyte containing dissolved lithium ions. Surprisingly, the object could also be fulfilled without dissolved lithium ions if the electrolyte is sufficiently hygroscopic. The invention is further characterized by the fact that simultaneously to the migration of a non-aqueous electrolyte, optionally containing lithium ions, into the concrete, a migration and thus extraction of alkali ions, in particular sodium and potassium ions, from the concrete to a cathodically polarized electrode may take place.

The inventive method is characterized by the fact that several inventive arrangements of electrodes fulfill the task. Thus, the inventive method of avoiding or at least significantly reducing ASR-induced damage to concrete can be flexibly adapted to the local and specific requirements of a component to be protected.

The present invention is further specified by the following FIGS. 1 to 5.

FIG. 1 shows one of the possible inventive arrangements of electrodes:

Embodiment 1a: An anode B embedded in a suitable medium C according to the invention is attached to the surface of the concrete component A to be protected. The inventive medium C may contain at least one lithium salt, for example selected from lithium nitrate, lithium hydroxide, lithium carbonate, lithium sulfate, lithium perchlorate, lithium chloride, lithium bromide, lithium acetate, lithium citrate. The non-aqueous electrolyte is preferably hygroscopic for drying out the concrete, especially if used without dissolved lithium ions. Drill holes D are drilled in the concrete component A, e.g. with a suitable drilling machine. Cathodes E are inserted into the drill holes D in a medium F according to the invention. The medium F can be either an aqueous electrolyte solution or a non-aqueous electrolyte that is miscible with water and dissolves alkali salts. The medium F is preferably a nonaqueous electrolyte. As suitable non-aqueous electrolyte, among others polyethers proved to be very suitable, e.g. polyglycols such as polyethylene glycol, or polypropylene glycol. By means of a suitable external power supply, an electrical voltage is applied between the anode B and the cathodes E in such a way that a current of 0.1-50 amperes, preferably between 1 and 10 amperes, flows between the anode B and the cathodes E. The advantage is that the drill holes D are flushed with a suitable electrolyte solution, preferentially with a non-aqueous electrolyte that is miscible with water and dissolves alkali salts, so that the sodium ions migrating to the cathode are removed and back diffusion into the concrete is prevented. This flushing can be sequential or continuous.

Embodiment 1b: A cathode B embedded in a suitable medium C according to the invention is attached to the surface of the concrete component A to be protected. Drill holes D are drilled in the concrete component A, e.g. with a suitable drilling machine. Anodes E are inserted into the drill holes D in a medium F according to the invention which contains at least one lithium salt, for example selected from lithium nitrate, lithium hydroxide, lithium carbonate. By means of a suitable external power supply, an electrical voltage is applied between the anodes E and the cathode B in such a way that a current of 0.1-50 amperes, preferably between 1 and 10 amperes, flows between the anodes E and the cathode B. With this design, lithium ions and/or a non-aqueous electrolyte are injected directly into the depth of the concrete component.

Figure 2A:
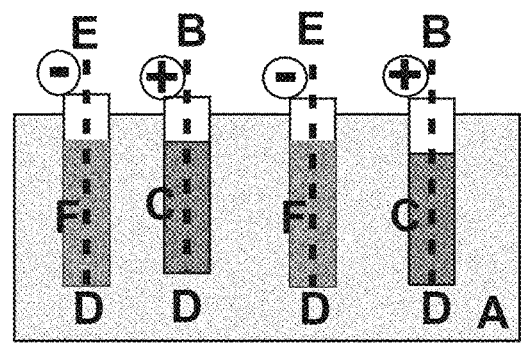
FIG. 2a shows an embodiment of a section of a concrete component fitted with anodes.
Figure 2B:
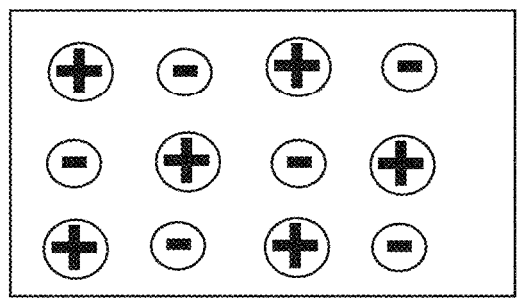
FIG. 2b shows an embodiment of a section of a concrete component fitted with anodes.

FIG. 2 shows a further arrangement of electrodes according to the invention. FIG. 2a schematically shows the section of a concrete component fitted with the anodes in accordance with the invention, FIG. 2b shows the view of the schematic arrangement of the anodes in accordance with the invention:

Drill holes D are drilled in the concrete component A, e.g. with a suitable drilling machine. Anodes B and cathodes E are inserted into the drill holes D in a medium C—anolyte according to the invention a non-aqueous electrolyte which may contain at least one lithium salt, for example selected from lithium nitrate, lithium hydroxide, lithium carbonate and lithium hydroxide. The medium F—the catholyte—is preferentially also a non-aqueous electrolyte that is miscible with water and dissolves alkali salts—e.g. the same electrolyte that is used for preparing the anolyte. The electrodes are preferably arranged in such a way that a cathode E is arranged next to an anode B or a cathode E is surrounded by anodes B as shown in FIG. 2b.

By means of a suitable external power supply, an electrical voltage is applied between the anodes B and the cathodes E in such a way that a current of 0.2-55 amperes, preferably between 0.5 and 15 amperes, flows between the anodes B and the cathodes E.

The advantage is that the "cathodic" boreholes are flushed with a suitable electrolyte solution, as described in FIG. 1a, to remove sodium ions in particular and thus prevent their back diffusion. This flushing can be sequential or continuous.

One advantage of this design is that the lithium-containing electrolyte in the drill holes can be replaced and/or supplemented without great effort.

Figure 3:
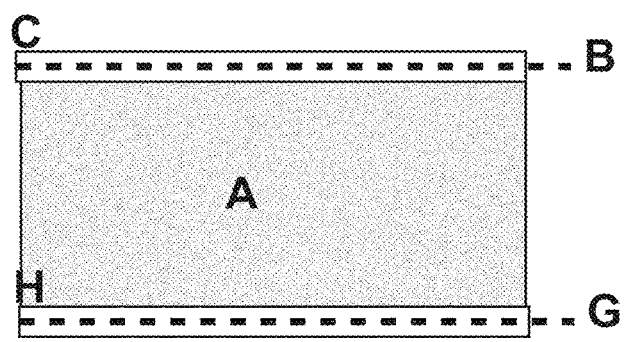
FIG. 3 shows an emobdiment of an arrangement of electrodes.

FIG. 3 shows a further arrangement of electrodes according to the invention: The electrodes are placed on both sides of the concrete member A to be treated for ASR reaction—on one side an anode B and on the opposite side a cathode G. An anode B embedded in a suitable medium C according to the invention is attached to the surface of the concrete member A to be protected. The anolyte C may contain at least one lithium salt, for example selected from lithium nitrate, lithium hydroxide, lithium carbonate, lithium sulfate, lithium perchlorate, lithium chloride, lithium bromide, lithium acetate, lithium citrate. As suitable electrolyte, as described above, among others polyethers proved to be very suitable, e.g. poly-glycols such as polyethylene glycol, polypropylene glycol. The non-aqueous electrolyte is preferably hygroscopic for drying out the concrete, especially if used without dissolved lithium ions. The cathode G is embedded into a medium H containing an electrolyte as described for FIG. 1a. A voltage and a current is applied as described for FIGS. 1a and 1b.

The anode material preferably used is a material which is resistant to anodic oxidation, e.g. MMO titanium mesh, sheet, wire, rods and tubes. The preferred cathode material is a material that is electrically conductive and resistant to alkaline environments, such as titanium, stainless steel, nickel, copper and carbon e.g. graphite fibers.

Figure 4:
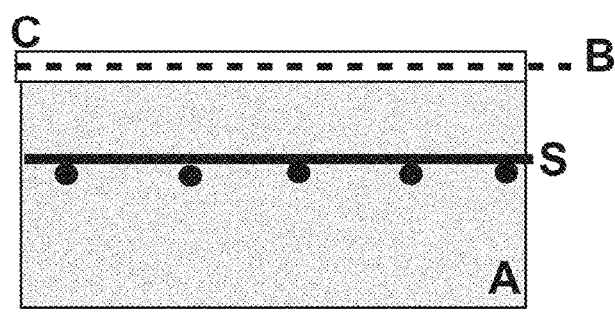
FIG. 4 shows an embodiment of an arrangement of an electrode and a steel reinforment.
Figure 5:
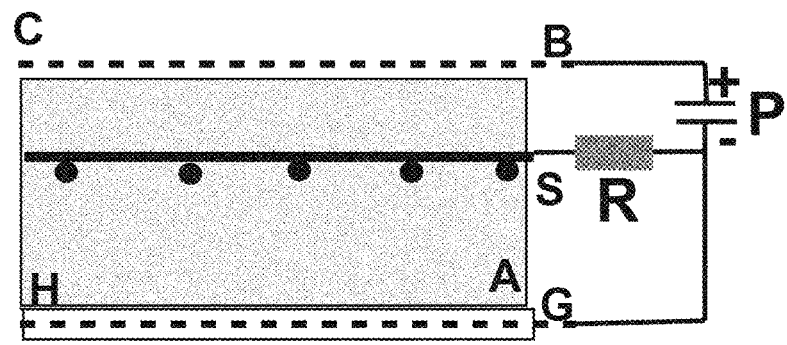
FIG. 5 shows an embodiment of an arrangement of electrodes and a steel reinforment.

In principle, the steel reinforcement can of course also be used as an electrode, but only as a cathode as shown in FIG. 4. Analogously to the electrode arrangement described in FIG. 1 a, an anode B embedded into a suitable medium C is attached to the surface of the reinforced concrete member A. In this electrode arrangement, the steel reinforcement S is polarized as cathode through an external power supply as described for the FIGS. 1-3. The steel reinforcement always has to be polarized cathodically to prevent corrosion of the steel reinforcement. To prevent corrosion of the steel reinforcement or of any other metallic part within the electric field generated, all cathodically polarized metallic parts have to be interconnected. The electrode arrangements described for FIGS. 1-3 may be employed also for steel-reinforced concrete provided that the steel reinforcement is polarized cathodically. In such an arrangement, the steel reinforcement S may be employed as an auxiliary cathode that is polarized to a lesser extent then the operating cathode G by placing an electric resistor R (having an electrical resistance between 0.1 and 10,000 KOhms) between the power supply P and the steel reinforcement as shown in FIG. 5. In this way, hydrogen evolution on the steel reinforcement may be prevented. Hydrogen evolution may also be prevented by applying the electric field in a suitable EOP mode—as described below—by oxidizing the nascent hydrogen by anodic pulses applied to the steel reinforcement. If the steel reinforcement S is used as the sole cathode then no electrical resistance would be placed.

A special embodiment consist of operating the electrode arrangement in an electro-osmotic pulse mode (EOP mode), wherein the anode and cathode are not constantly being polarized by a D.C. current source but rather by a series of cyclic pulses both positive and negative creating a repetitive pattern in which effects the non-aqueous electrolyte flow from the anode to the cathode. A series of cyclic pulses was used as described in U.S. Pat. Nos. 5,368,709 and 5,755,945 to dehydrate capillary materials such as masonry or concrete. However, the inventions were focused on moving moisture (water) away from the structure by means of creating an electro-osmotic force from the anode to the cathode placed outside the structure.

The current invention utilizes the formation of an electro-osmotic force created by means of a series of pulses with a repetitive pattern to effect the movement and transport of non-aqueous electrolyte into the concrete, wherein preferably the non-aqueous electrolyte carries lithium ions.

Furthermore, the current invention takes into consideration the need to reduce the stray current corrosion that could be a result of introducing the DC or Pulse voltage between the anode and cathode. The current invention identifies the need to connect the steel reinforcement through an automatically variable resistance to the cathode of the circuit, wherein the electrical resistance has a value between 0.1 and 10,000 KOhm. The resistance value is controlled by means of a dedicated controller that changes the resistance value to ensure that no positive potential shift is identified at the steel reinforcement. The apparatus generating the pulse pattern also ensures that the steel reinforcement is disconnected during the negative portion of the pulse shape.

As an anolyte, non-aqueous electrolytes with a conductivity of >0.1 µS/cm are suitable containing dissolved lithium salts such as lithium nitrate, lithium hydroxide, lithium carbonate, lithium sulfate, lithium perchlorate, lithium chloride, lithium bromide, lithium acetate, lithium citrate, which are preferably embedded in a gel, a fleece in which also the anode is embedded. As anolyte, a non-aqueous electrolyte without dissolved lithium ions is suitable if it is sufficiently hygroscopic. Ordinary tap water can be used as the catholyte, as the salts that dissolve from the concrete produce sufficient conductivity.

Aqueous electrolytes have a negative effect as they cause a high moisture input into the concrete component. The ASR is accelerated in particular by high humidity (see D. W. Hobbs, *Alkali-Silica Reaction in Concrete*, Thomas Telford, London, 1988). Therefore, non-aqueous electrolytes miscible with water and acting as solvent for alkali salts are preferred catholytes.

Therefore, the present invention uses non-aqueous electrolytes, preferably alcohols such as methanol, ethanol, propanol, butanol, cyclohexanol, benzyl alcohol, diols such as glycol, glycerol, ethanediol, diethylene glycol, triethylene glycol, 2-methoxyethanol and polyols, and polyethers such as, polyglycols, polyoxymethylenes, polyalkylene ethers (PAE), copolymers of polyalkelene ethers e.g. with glycole. Ethers such as dimethoxyethane and cyclic ethers such as dioxane, tetrahydrofurane etc. proofed to be suitable too. Surprisingly, polyethers such as polyglycols, have proven to be particularly advantageous. Polyalykylene ethers, preferably polyethylene glycol, polypropylene glycol have good electrical conductivity and good solubility for alkali salts, especially lithium, potassium, sodium salts, the electrical conductivity being greatly increased by the dissolution. They are therefore suitable both as electrolytes and as solvents for lithium salts such as lithium nitrate and lithium hydroxide.

Conductivity of the electrolyte should be at least 0.01 µS/cm, preferred to be >1 µS/cm. Admixture with water, preferably not more than 10 wt. % leads to an increase of conductivity by 50-100%. Dissolution of lithium salts may increase conductivity to values >100 µS/cm.

Therefore, any non-aqueous electrolyte is suitable having an electrical conductivity of equal or more than 0.01 µS/cm that absorbs water and exhibits a viscosity low enough that allows it to penetrate the concrete pore space.

Polyethylene glycol (PEG) is also very hygroscopic and thus has a drying effect on the concrete, thus reducing the alkali-silica reaction (ASR), which only occurs at high moisture levels and leads to ASR concrete damage. It was also shown that concrete can be easily impregnated with PEG, preferably PEG with low viscosity, such as with a molecular weight of 200 g to 600 g. Surprisingly, it turned out that the impregnation of concrete with PEG can be greatly accelerated by an applied electric field. In an electric field of 5-100 volts, preferably 10-50 volts, dense concrete containing air voids can also be impregnated with POE's, preferably PEG, to achieve frost and de-icing salt resistance.

The non-aqueous electrolyte may also contain water. These electrolyte materials are preferentially hygroscopic and therefore reduce the ASR by drying out the concrete component.

If a non-aqueous electrolyte is used, which leads to the concrete drying out or at least to a reduction of the concrete moisture, the use of the steel reinforcement as cathode can be sufficient—an extraction of sodium ions is not necessary although advantageous.

However to prevent ingress of water into the concrete that may instigate or increase the ASR and induce further damages, preferentially also a non-aqueous electrolyte, preferentially a similar or the same electrolyte that is used as anolyte is employed as catholyte.

As described above, the electric field is generated by applying a DC voltage by an external DC power supply. The applied voltage depends on the resistivity of the concrete which depends on concrete humidity, porosity and salt content of the concrete pore solution. The voltages that are usually applied to obtain currents in the range of 0.1-5 A/m² electrode surface range from 5-100 Volts, in most cases from 15-30 Volts.

Surprisingly, it turned out that pulsed DC voltages—also denominated as electro-osmotic pulse (EOP) operated electric fields strongly enhances both—the migration of the polyether, especially of polyethylene glycol and the migration of lithium ions.

EXAMPLES

Example 1

Aim of the test was to demonstrate the effect of the electric field on the migration of lithium ions dissolved into a non-aqueous electrolyte. Two bore holes A, C with a diameter of 25 mm were drilled down to a depth of about 40 mm in a distance of 100 mm respectively 75 mm edge to edge into a concrete specimen with the dimensions of 10×10×30 cm as shown in FIG. 6 a. A third bore hole B was drilled in a distance of 5 cm from the edge of the concrete specimen as a blank (not exposed to an electric field).

The concrete specimen was a standard concrete with ordinary Portland cement (OPC) content of 380 kg/m³, a water/cement ratio of 0.55 and aggregate size 0 to 8 mm. The concrete specimen was hardened over a period of 10 years, water fillable porosity was determined to be 10 vol. %.

The bore hole A was filled with a non-aqueous electrolyte, in the following denominated as anolyte, prepared from polyethylene glycol 400, 10 wt. % deionized water and 2 wt. % lithium dissolved as lithium hydroxide with a total volume of 20 ml.

The bore hole C was filled with a non-aqueous electrolyte, in the following denominated as catholyte, prepared from polyethylene glycol 400 and 10 wt. % deionized water with a total volume of 20 ml.

The bore hole B was filled with the same electrolyte as bore hole C with a total volume of 25 ml.

In all three bore holes, an electrode made from MMO activated titanium mesh, commercially available as DURANODES, with a length of 5 cm and a diameter of 7 mm was placed. The electrode placed in bore hole A was polarized as anode and the electrode placed in bore hole C was polarized as cathode by connecting them to a DC power supply. Applied voltage was constant 25 V. The electrode placed in bore hole B was left outside the electric field and used as blank.

The whole set (concrete specimen, electrode assembly and electric connections) were stored in a closed transparent compartment at a constant relative humidity of 80%.

The expansion and impregnation of the concrete specimens with the nonaqueous electrolyte could be followed visually on the concrete surface; the ingress of the electrolyte into the concrete was measured by recording the amount of electrolyte that had to be added to fill up the bore hole up to the rim, the current flowing between anode and cathode was recorded also.

Figure 6A:
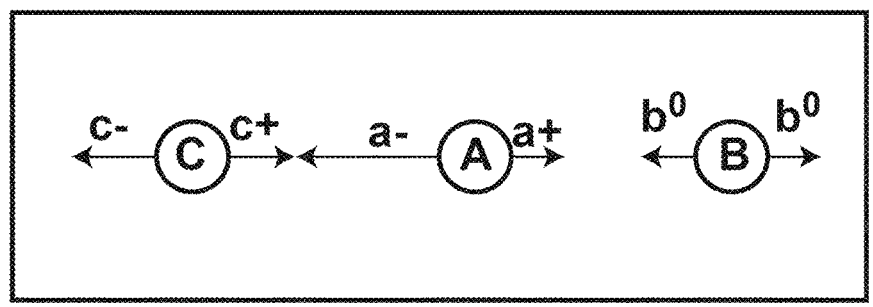
FIG. 6a shows an arrangement of Example 1.

During operation, the anolyte moved preferentially towards the cathode (depicted as a– in FIG. 6a) whereas the catholyte expanded relatively slow towards the anolyte (c+ in FIG. 6a) but expanded preferentially towards the space opposite to the anode (c– in FIG. 6a). Analogically, the anolyte expanded significantly slower from the cathode away (a+ in FIG. 6a) as it was retracted and impeded to move from the anode and cathode away.

The expansion of the electrolyte around the blank hole B was about symmetrically. The system was operated until the electrolytes of both, the anolyte and catholyte met each other after about 4 weeks of operation, the anolyte having been expanding about 50 mm towards the cathode and the catholyte expanding about 25 mm towards the anode.

The expansion of the electrolyte (b° in FIG. 6a) around the blank hole B was about 30 mm.

The DC current started with 0.8 mA (0.5 A/m² electrode surface) and increased during operation to 3.6 mA (6 A/m² electrode surface).

As the non-aqueous electrolytes have expanded into the pore volume of the concrete specimen, the non-aqueous electrolytes had to be replenished regularity. The values of electrolyte replenishment—normalized to the electrode surface and the corresponding current measured are listed in Table 1.

TABLE 1

Electrolyte replenishment and DC currents during DC operation (electrode surface was assumed to be 50% of the bore-hole surface)

| Time of operation days | Anolyte wt. % of bore hole filling | Catholyte wt. % of bore hole filling | Blank (no current) wt. % of bore hole filling | Current mA/m² electrode surface |
|---|---|---|---|---|
| 0 | 0 | 0 | 0 | 60 |
| 1 | 25 | 20 | 20 | 70 |
| 7 | 135 | 140 | 120 | 90 |
| 14 | 205 | 195 | 245 | 130 |
| 21 | 295 | 300 | 325 | 160 |
| 28 | 358 | 370 | 390 | 240 |
| 49 | 490 | 485 | 475 | 170 |
| 70 | 570 | 540 | 470 | 165 |

The data show clearly that initially up to about 21 days, capillary suction dominates the transport of the electrolyte into the concrete, after 21 days the electric field effect takes over: In the absence of the electric field, ingress of the electrolyte stops after about 28 days whereas in the presence of the electric field ingress of the electrolyte into the concrete continuous.

After completion of the impregnation of the concrete specimen with the electrolytes, the specimen was cut in the middle vertically through the center of the bore holes and carefully polished. The distribution of ions with special attention to the lithium ions was determined by laser ablation breakdown spectroscopy (LIBS) (G. Wilsch *, F. Weritz, D. Schaurich, H. Wiggenhauser, Determination of chloride content in concrete structures with laser-induced breakdown spectroscopy, Construction and Building Materials 19 (2005) 724-730).

Lithium ions could be detected in the concrete matrix up to 30 mm from the edge of the anode bore hole towards the cathode (a– in FIG. 6a) whereas in the direction a+, lithium ions could only be detected up to 10 mm from the edge of the bore hole after operation of the system over a time period of 70 days.
(1) These results show clearly that the effect of the electric field in transporting lithium ions into the concrete.
(2) It also shows that the non-aqueous electrolyte supports the transport of lithium ions as it is generally known that out of aqueous electrolytes lithium ions penetrate into concrete only a few mm.
(3) Surprisingly the results support the finding that the transport of the nonaqueous electrolyte is supported by the electric field: The non-aqueous electrolyte moves faster into the concrete than the lithium-ions (56 mm vs. 30 mm).
(4) The preferential movement of the pure non-aqueous electrolyte (see above) confirms the effect of the electric field of transporting the nonaqueous electrolyte into the concrete by means of migration.

Example 2

Figure 6B:
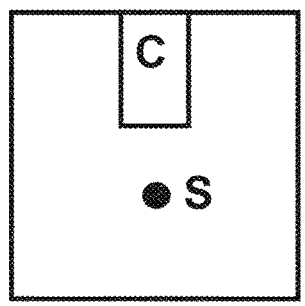
FIG. 6b shows an arrangement of Example 2.

The test described in Example 1 was repeated with the same concrete specimen containing a steel rebar (steel type BST 500 B) with a diameter of 10 mm and a length of 25 cm, placed 3 cm below the bottom of the bore-hole as shown in FIG. 6b. With the steel rebar, the migration of lithium ions and of the nonaqueous electrolyte was simulated in an electric DC field. Materials and set-up was identical to Example 1 except for the steel rebar and for the connection of the steel rebar to the cathode over a 50 KOhm resistor as shown in FIG. 5.

TABLE 2

Electrolyte replenishment and DC currents during DC operation (electrode surface was assumed to be 50% of the bore-hole surface)

| Time of operation days | Anolyte wt. % of bore hole filling | Catholyte wt. % of bore hole filling | Blank (no current) wt. % of bore hole filling | Current mA/m2 electrode surface |
| --- | --- | --- | --- | --- |
| 0 | 0 | 0 | 0 | 80 |
| 1 | 34 | 30 | 48 | 95 |
| 7 | 154 | 144 | 150 | 100 |
| 14 | 241 | 249 | 259 | 140 |
| 21 | 320 | 361 | 358 | 170 |
| 28 | 379 | 433 | 495 | 250 |
| 49 | 541 | 558 | 493 | 190 |
| 70 | 591 | 592 | 490 | 180 |

The main effect of the mildly polarized steel rebar (about –450 mV/vs. Ag/AgCl) on the migration of lithium ions and on the migration of the non-aqueous electrolyte was:
(1) The lithium ions migrated within 4 weeks down to the steel rebar and slightly beyond as expected from a rebar serving as a cathode. Potential mapping at the concrete surface revealed that the steel rebar near the anode is strongly polarized cathodically.
(2) The non-aqueous electrolyte is "attracted" by the cathodically polarized steel rebar.
(3) Migration of the non-aqueous electrolyte is enhanced from both, from cathode and anode.

Example 3

The test described in Example 2 was repeated with an EOP mode as follows:
Applied Voltage 25 Volts
Pulse Characteristics: 6 sec anodic-0.5 sec no current-0.5 sec anodic-0.5 sec no current-0.5 sec cathodic Lithium ions could be detected in the concrete matrix up to 40 mm from the edge of the anode bore hole towards the cathode (a– in FIG. 6a) whereas in the direction a+, lithium ions could be detected up to 12 mm from the edge of the bore hole after operation of the system over a time period of 70 days. The lithium ions reached the rebar on a broad front.

TABLE 3

Electrolyte replenishment and DC currents during DC operation (electrode surface was assumed to be 50% of the bore-hole surface)

| Time of operation days | Anolyte wt. % of bore hole filling | Catholyte wt. % of bore hole filling | Blank (no current) wt. % of bore hole filling | Current mA/m2 electrode surface |
| --- | --- | --- | --- | --- |
| 0 | 0 | 0 | 0 | 105 |
| 1 | 38 | 34 | 45 | 110 |
| 7 | 165 | 158 | 145 | 125 |
| 14 | 265 | 252 | 230 | 165 |
| 21 | 345 | 345 | 298 | 210 |
| 28 | 410 | 405 | 367 | 270 |
| 49 | 576 | 565 | 467 | 258 |
| 70 | 658 | 645 | 485 | 226 |

The data show clearly that the migration of the non-aqueous electrolyte is significantly enhanced by the EOP mode in comparison with the DC mode shown in Example 2.

Example 4

The movement respectively the ingress of polyethylene glycol PEG 200 as a non-aqueous electrolyte in a high-quality concrete with low porosity and high airvoid content—a type of concrete that is used in environments with a high exposure to thaw salts and frequent freezing conditions.

Three steel-reinforced pre-cast concrete members (w×h×l=24 cm×20 cm×60 cm) made from concrete with 340 kg/m³ OPC, w/c=0.45 and aggregate size 0 to 32 mm with a water accessible capillary porosity of 4 vol. % and an air—void content of 6 vol. %. This concrete is formulated to show high resistant to water penetration. The concrete members were stored at a relative humidity 80%.

A pair of bore holes with a diameter of 25 mm up to a depth of 160 mm were drilled into the concrete members at a distance of 200 mm. The bore holes were centered on the concrete surface (about 10 cm from the side edges, about 17 cm from the end-edges).

The bore-holes were filled with the non-aqueous electrolyte polyethylene glycol MW 200 (PEG 200) admixed with 5% of deionized water (volume 90 ml), conductivity of the electrolyte: 13 µS/cm.

One set of bore-holes was operated in DC mode by applying DC voltage of 25 Volts, one set of bore-holes was operated in EOP mode by applying a pulsed voltage with the following pulse length and directions: 6 sec anodic-0.5 sec no current-0.5 sec anodic-0.5 sec no current-0.5 sec cathodic. Voltage applied 30 Volts. Currents 200-800 mA/m² electrode surface.

The volume of the electrolyte replenished (refilled) was measured over time and is listed in Table 4. The movement of the electrolyte in the concrete members exposed to an applied electric field (anolyte=anodically polarized electrolyte in bore holes, catholyte=cathodically polarized electrolyte in bore holes) depends on the type of polarization and of the type of applied electric field (DC or EOP): The PEG 200 electrolyte is highly hygroscopic and therefore absorbs water out of the pores of the surrounding concrete, for that reason the bore holes tended to overflow during the initial 40-60 days.

TABLE 4

Electrolyte replenishment (cumulative) during DC and EOP operation of PEG 200/5% H$_2$O electrolyte in comparison to no-field operation (blank) in low porosity frost-thaw salt resistant concrete

| Time of operation days | Anolyte EOP ml | Anolyte DC ml | Catholyte EOP ml | Catholyte DC ml | Blank 1 ml | Blank 2 ml |
|---|---|---|---|---|---|---|
| 0 | 0 | 0 | 0 | 1.4 | 0 | 0 |
| 7 | −1.5 | 1.4 | −10.0 | −2.6 | 1.4 | 1.2 |
| 19 | 0.0 | −2.0 | −9.0 | 0.2 | 3.0 | −1.6 |
| 28 | −2.6 | −1.0 | −11.1 | −1.2 | 1.7 | 1.7 |
| 40 | 0.5 | −3.4 | −13.2 | −0.3 | 1.7 | 2.1 |
| 49 | 3.0 | −2.0 | −6.8 | −3.9 | 1.7 | 1.5 |
| 56 | 5.0 | 2.0 | −0.5 | −0.2 | 1.7 | 1.5 |
| 77 | 10.0 | 8.0 | 5.4 | 5.0 | 1.7 | 1.5 |
| 123 | 20.0 | 17.0 | 13.5 | 12.9 | 1.7 | 1.5 |
| 145 | 25.0 | 21.0 | 16.9 | 15.6 | 1.7 | 1.5 |

The corresponding negative values (volume increase) were determined as follows: e.g. at time 1 day, 15 ml of electrolyte have been removed from the bore hole, after 7 days, the electrolyte was replenished (filled up to the rim of the bore hole) and the difference between the 15 ml initially removed and the amount of electrolyte added—negative sign signify volume of electrolyte increased (due to hygroscopic water take up), positive values signify electrolyte had to be replenished as it penetrated into the concrete. After a time period of about 40-60 days, the balance for both operation modes—EOP and DC and for both types of polarization—anodic and cathodic—became positive—the electrolyte moved into the concrete. EOP mode was significantly more efficient than DC mode. Transport of electrolyte from anodic bore holes was more efficient than from cathodic polarized bore holes.

There was no significant movement of electrolyte from or into the "blank" bore holes not exposed to an electric field. The results may indicate that without an electric field in the dense low porosity concrete, there is almost no penetration of the non-aqueous electrolyte into the concrete, penetration is about to be balanced by hygroscopic water take up.

The results show clearly, that the movement of the non-aqueous electrolyte into the concrete pore system is strongly assisted and supported by an applied electric field, EOP mode being more efficient than DC mode.

The invention claimed is:

1. A method for impregnating concrete with a non-aqueous electrolyte, comprising
    applying an electric field between electrodes mounted on a surface of the concrete and/or embedded in the concrete such that the non-aqueous electrolyte migrates into the concrete,
    wherein the non-aqueous electrolyte absorbs water and is hygroscopic, and
    wherein the the non-aqueous electrolyte comprises polyethylene glycol.

2. Method according to claim 1, wherein lithium ions are dissolved in the non-aqueous electrolyte and the non-aqueous electrolyte has a conductivity of greater than 100 µS/cm.

3. Method according to claim 1, wherein the non-aqueous electrolyte has a conductivity of at least 0.01 µS/cm.

4. Method according to claim 1, wherein the non-aqueous electrolytes has a conductivity of greater than 0.1 µS/cm.

5. Method according to claim 1, wherein the non-aqueous electrolyte has a conductivity of greater than 1 µS/cm.

6. Method according to claim 1, wherein the electric field is generated by a current flow between an electrode mounted on the concrete surface and at least one electrode inserted into the concrete.

7. Method according to claim 1, wherein the electrode attached to the concrete surface is anodically polarized and the electrodes embedded in the concrete are cathodically polarized.

8. Method according to claim 1, wherein the electrode attached to the concrete surface is cathodically polarized and the electrodes embedded in the concrete are anodically polarized and surrounded by non-aqueous electrolyte.

9. Method according to claim 1, wherein at least one lithium salt is available at the anodically polarized electrode, comprising lithium nitrate, lithium hydroxide, or lithium carbonate.

10. Method according to claim 1, wherein the cathodically polarized electrode is embedded in a medium which can absorb alkali ions comprising sodium, or potassium.

11. Method according to claim 1, wherein a pulsating DC voltage pattern is provided by an apparatus capable of changing the pulse pattern as desired by user.

12. Method according to claim 11, wherein the said apparatus automatically controls the value of the Pulsating DC voltage as a response to the amount of current passed from anode to cathode.

13. Method according to claim 11, wherein said apparatus is capable of controlling the electrical resistance between steel reinforcement and a cathode.

14. Method according to claim 1, wherein
    the electrodes comprise a cathode and an electrode, and
    a metal is connected to the cathode via an electrical resistance in a component of the concrete in which the metal is embedded.

15. Method according to claim 14, wherein the electrical resistance between the cathode and the metal, comprising a steel reinforcement, has a value between 0.1 and 10,000 KOhms.

16. Method according to claim 15, wherein the steel reinforcement is used as an electrode.

17. Method for impregnating concrete with lithium ions, comprising applying an electric field between electrodes mounted on a surface of the concrete and/or embedded in the concrete, wherein at least one electrode, comprising the anode, is embedded in a non-aqueous electrolyte comprising polyethylene glycol, such that lithium ions migrate into the concrete.

18. Method according to claim 17, wherein the electric field is generated by a pulsating DC voltage of a repetitive pattern applied across the anode and cathode.

* * * * *